US010451406B2

(12) United States Patent
Lavrinov

(10) Patent No.: US 10,451,406 B2
(45) Date of Patent: Oct. 22, 2019

(54) TWO-DIMENSIONAL LASER TRIANGULATION SENSOR FOR MEASURING SMALL DIAMETER HOLES

(71) Applicant: OBSHCHESTVO S OGRANICHENNOJ OTVETSTVENNOSTYU "GEOMERA", Ekaterinburg (RU)

(72) Inventor: Dmitrij Sergeevich Lavrinov, Ekaterinburg (RU)

(73) Assignee: OBSHCHESTVO S OGRANICHENNOJ OTVETSTVENNOSTYU "GEOMERA", Ekaterinburg (RU)

( * ) Notice: Subject to any disclaimer, the term of this patent is extended or adjusted under 35 U.S.C. 154(b) by 0 days.

(21) Appl. No.: 16/087,766

(22) PCT Filed: May 11, 2016

(86) PCT No.: PCT/RU2016/000163
§ 371 (c)(1),
(2) Date: Sep. 24, 2018

(87) PCT Pub. No.: WO2017/164761
PCT Pub. Date: Sep. 28, 2017

(65) Prior Publication Data
US 2019/0113331 A1    Apr. 18, 2019

(30) Foreign Application Priority Data

Mar. 22, 2016 (RU) ................. 2016110436

(51) Int. Cl.
*G01B 11/12* (2006.01)
*G01B 5/00* (2006.01)
(Continued)

(52) U.S. Cl.
CPC ............ *G01B 11/12* (2013.01); *G01B 5/0004* (2013.01); *G01B 11/007* (2013.01); *G01B 11/2518* (2013.01)

(58) Field of Classification Search
CPC ...... G01B 11/12; G01B 11/2408; E21B 47/08
See application file for complete search history.

(56) References Cited

U.S. PATENT DOCUMENTS 8,841,603 B1 * 9/2014 Blanton ............ G01B 11/2518
250/256
2009/0237677 A1 * 9/2009 Aoki ...................... G01B 11/12
356/602

(Continued)

OTHER PUBLICATIONS

Keyence Corporation, «LJ-G015 Sensor Head,» Keyence Corporation, Dec. 1, 2015. Available: https://www.keyence.com/products/measure/laser-2d/lj-g/models/lj-g015/index.jsp. [Date of reference: Dec. 1, 2015].

(Continued)

Primary Examiner — Maurice C Smith
(74) Attorney, Agent, or Firm — Dmitry S. Kryndushkin

(57) ABSTRACT

A two-dimensional laser triangulation sensor for measuring small diameter holes. The housing of the sensor is cylindrical and consists of two coaxial cylindrical parts, joined by their ends. The cylindrical parts of the housing have different diameters, and an optical circuit of the sensor is disposed in the cavity of the larger diameter cylindrical part of the sensor housing, said optical circuit consisting of a laser emitter, an electronic printed circuit board with a built-in CMOS array, and a focusing lens, which is mounted at an angle to the electronic printed circuit board. The larger diameter cylindrical part of the housing is provided with an aperture, in which a protective glass is mounted. A power supply and computation unit is disposed in the cavity of the smaller diameter cylindrical part of the housing. The power supply and computation unit consists of an electronic printed circuit board having arranged thereon a connector for connecting a CMOS array connector to a processor for processing data from the CMOS array, a power control microcircuit, a power connector, and a connector for data transfer to an electronic computer. An opening is provided in the joined ends of both parts of the housing, said opening connecting the cavities of the two parts of the housing and having wires laid therein for supplying power and for controlling the operating modes of the laser and the array, as well as for transferring data from the array to the computation unit. The sensor additionally contains a cylindrical bracket, which is coaxially joined to the second end of the smaller diameter cylindrical part of the (Continued)

housing and has disposed therein wires for supplying power to the power and computation unit and wires for communication with the electronic computer.

10 Claims, 9 Drawing Sheets

(51) Int. Cl.
  *G01B 11/00* (2006.01)
  *G01B 11/25* (2006.01)

(56) References Cited

U.S. PATENT DOCUMENTS

| | | | |
|---|---|---|---|
| 2016/0069672 A1* | 3/2016 | Xie | G01B 11/30 356/600 |
| 2017/0097306 A1* | 4/2017 | Ullrich | G01B 5/003 |
| 2017/0248419 A1* | 8/2017 | Kudo | G01B 21/20 |

OTHER PUBLICATIONS

SmartRay GmbH, «Model SR5650-85,» SmartRay GmbH, Dec. 1, 2015. [В Интернете]. Available: https://www.smartray.com/wp-content/uploads/2017/02/DS_SR5600.pdf. [Date of reference: Dec. 1, 2015].

Sensor Instruments GmbH, «L-LAS Series,» Dec. 1, 2015. Available: https://www.sensorinstruments.de/pdf/products/344en.pdf. [Date of reference: Dec. 1, 2015].

LLC "Diesel-test-kit", "Laser Measuring Equipment," Dec. 9, 2010. Available: https://ru.d-test.ru/pdf/DTC-laser.pdf. [Date of reference: Dec. 1, 2015].

\* cited by examiner

Fig.2
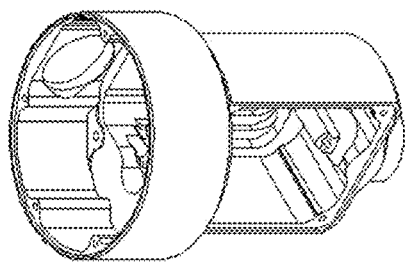
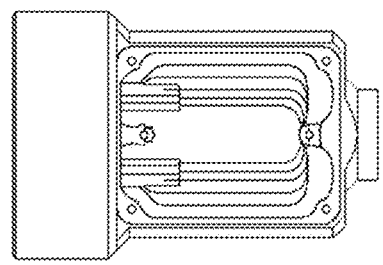
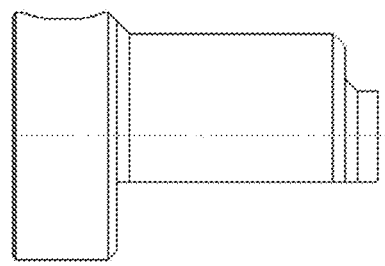
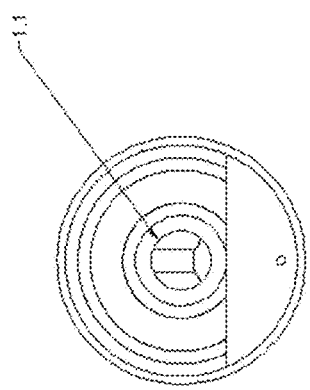
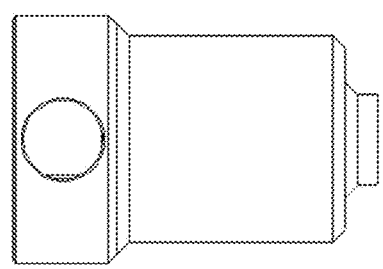
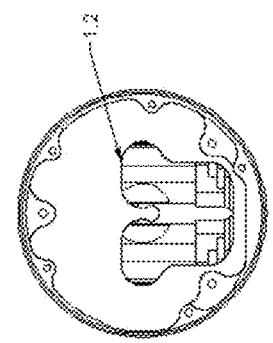

TWO-DIMENSIONAL LASER TRIANGULATION SENSOR FOR MEASURING SMALL DIAMETER HOLES

FIELD OF THE INVENTION

Metrological technique for scanning surface geometry and quality control of geometric parameters of solid objects.

BACKGROUND

The world biggest manufacturers of laser 2D scanners, which are analogues to the product of Geomera LLC, can be considered Keyence, SmartRay, Sensor Instruments, Riftek. Riftek sells smaller volumes of products compared to the above companies, but offers the closest analogues of the claimed technical solution:

1) The sensor LJ-G015 produced by Keyence has a size of 70*64*34 mm., which will not allow it to be put into a hole with a diameter of 68 mm. The sensor measurement error is ±0.0025 mm. Direct data transfer from the CCD matrix is possible (https://www.keyence.com/products/measure/laser-2/lj-g/models/lj-g015/index.jsp).

2) The SR5650-85 sensor manufactured by SmartRay has dimensions of 82*52.5*27.5 mm, which will not allow it to be out into a hole with a diameter of 68 mm. The sensor measurement error is ±0.035 mm. Direct data transfer from the CCD matrix is not possible (https://www.smartray.com/wp-content/uploads/2017/02/DS SR5600.pdf).

3) Sensor L-LAS-LT-20-CL manufactured by Sensor Instruments has dimensions of 82.26*80*20 mm, which will not allow it to be put into a hole with a diameter of 68 mm. The sensor measurement error is ±0.002 mm. Direct data transfer from the CCD matrix is not possible (https://www.sensorinstruments.de/pdf/products/344en.pdf).

4) The RF620S-8 sensor manufactured by Riftek is capable of measuring pipes and couplings with a diameter of 110 mm. The sensor measurement error is ±0.002 mm. Direct data transfer from the CCD matrix is possible, but the maximum transmission frequency is 15 Hz (https://ru.d-test.ru/pdf/DTC-laser.pdf).

5) The RF620S1-8 sensor manufactured by Riftek is capable of measuring pipes and couplings from 50 mm in diameter, but the depth of measurement from the end face of a coupling and pipe is 100 mm. The sensor measurement error is ±0.002 mm. Direct data transfer from the CCD matrix is possible, but the maximum transmission frequency is 15 Hz (https://ru.d-test.ru/pdf/DTC-laser.pdf).

6) The RF620S2-8 sensor manufactured by Riftek is capable of measuring pipes and couplings with a diameter of 110 mm. The sensor measurement error is ±0.002 mm. Direct data transfer from the CCD matrix is possible, but the maximum transmission frequency is 15 Hz (https://ru.d-test.ru/pdf/DTC-laser.pdf).

The drawback of all these analogues, except for RF620S1-8, is the impossibility of scanning the holes of couplings with a diameter of 68 mm. However RF620S1-8 is not capable of making measurements in the narrowest part at a distance of at least 132 mm from the end face. The main barrier for solving such a problem with existing models of laser triangulation 2D scanners is their overall dimensions.

A sufficient error for the measurement of the surface of a country oil tubular goods (COTG) is ±0.005 mm. This requirement must be observed for the scanners models in question.

Also, for the implementation of adaptive algorithms for scanning of a threads of COTG, the possibility of high-speed direct data transmission (100 Hz) from the CMOS sensor array to the PC is required, which is often either absent in similar models or implemented at very low speed.

SUMMARY OF THE INVENTION

The problem solved by the claimed invention is the creation of a laser triangulation two-dimensional scanner that provides scanning of the surface of holes with a diameter of 65 mm. at a distance of at least 132 mm from the end face.

The technical result of the claimed invention consists in producing of an opportunity to mount the laser scanner on precise manipulators and in reducing the scanning measurement error ±0.005 mm.

The technical result of the claimed invention is achieved due to the fact that the laser two-dimensional triangulation sensor for measuring small diameter holes comprising a housing, a laser emitter, a CMOS matrix is characterized in that the sensor housing is cylindrical and consists of two coaxial cylinders, also the cylindrical parts of the housing being of different diameters, also the optical setup of the sensor is inside of the larger diameter cylindrical part of the sensor housing and consists of a laser emitter, an electronic printed circuit board with an embedded CMOS matrix mounted at an angle to the focusing lens; the larger-diameter cylindrical part of the housing has a hole with a protective glass; the power supply and computation unit is inside of the smaller diameter cylindrical part of the housing and consists of an electronic circuit board with a connector mounted on it for connecting to a CPU for processing data from a CMOS matrix, also unit has CMOS connector, power management chip, power connector and computer data connector; the aligned cylinders of both parts of the housing are connected by inside hole, and power wires, laser and matrix control wires, as well as data transmission wires from the CMOS matrix to the computing unit are going through the hole; the sensor further comprises a cylindrical bracket coaxial with the smaller diameter cylinder of the housing, and power wires with data transmission wires from the housing are going through the hole inside of the bracket to the PC.

In a particular embodiment of the claimed invention, the cylindrical body parts are 22.5 mm and 57 mm in length and 60 mm in diameter and 50 mm in diameter, respectively, and the smaller cylindrical part of the housing is truncated along a chord with a length of 44.9 mm.

In a particular embodiment of the claimed invention, the laser emitter is made with a diameter of 12 mm and a length of 20 mm, an electronic printed circuit board is made with a width of 20 mm. and a length of 20 mm, and is located at an angle of 60° to the laser emitter, and the focusing lens is made 8 mm in diameter, and installed at an angle of 55° to the board with the CMOS matrix.

In a particular embodiment of the claimed invention, the electronic printed circuit board of the power supply and computation unit is made with a width of 40 mm, a length of 35 mm and a height of 10 mm. with the elements installed on it, also the power management chip has an input voltage of 9-36V.

In a particular embodiment of the claimed invention, the laser emitter generates a beam in the visible wavelength range of 640 nm.

In a particular embodiment of the claimed invention, the optical setup of the sensor is protected from external interference by a cover of an optical system with a diameter of 57.8 mm, and a protective glass with a diameter of 20.2 mm.

In a particular embodiment of the claimed invention, a measuring range of the sensor is an isosceles trapezoid, which has the small base is 3 mm apart from the housing, the larger is 8 mm apart from the housing.

In a particular embodiment of the claimed invention, the bracket is made with a diameter of 22 and a length of 126 mm.

In a particular embodiment of the claimed invention, the bracket is adapted to be attached to a motorized rotary head.

In a particular embodiment of the claimed invention, the sensor housing and the bracket are made of aluminum.

The technical result of the claimed invention is achieved by a special arrangement of the optical setup and electrical circuit, the housing parts, the bracket, the measuring range, the weight of the sensor and its overall dimensions.

BRIEF DESCRIPTION OF DRAWINGS

The details, features, and advantages of the present invention result from the following description of embodiments of the claimed laser two-dimensional triangulation sensor for measuring small-diameter holes using drawings in which:

FIG. 2 is the housing of the laser two-dimensional triangulation sensor;

Figure 1:
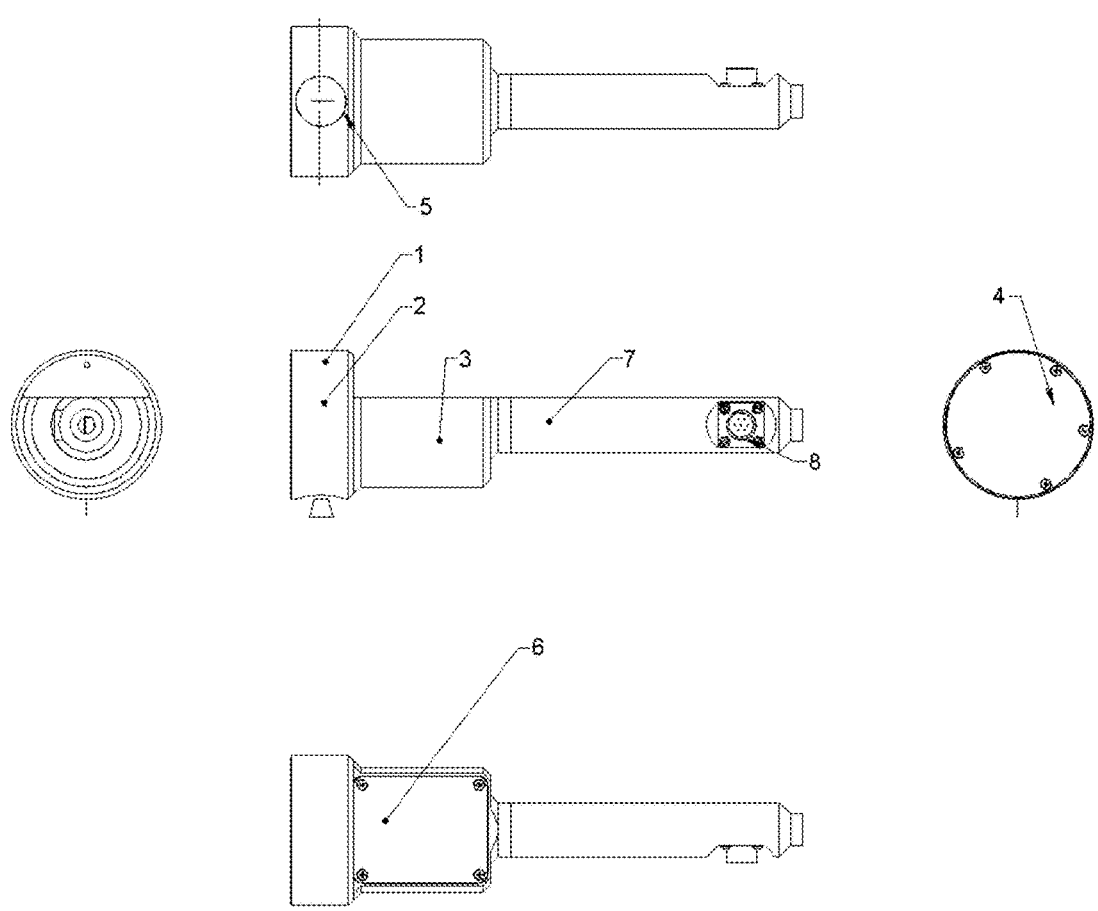
FIG. 1 is a general view of the laser two-dimensional triangulation sensor

The numbers in the figures indicate the following items:
  1—the case of the laser two-dimensional triangulation sensor; 1.1—hole; 1.2—computing unit; 2—the optical scheme of the sensor; 2.1—laser emitter, 2.2—electronic printed circuit board; 2.2.1—CMOS matrix; 2.3—focusing lens; 3—power supply and computation unit; 4—protective cover of the optical setup of the sensor; 5—protective glass of the optical setup of the sensor; 5.1—connector for connection to the processor; 5.2—processor for processing CMOS matrix data; 5.3—power supply microcircuit, 5.4—power connector; 5.5—the data transmission connector; 6—the protective cover of the power supply and the computation unit; 7—a cylindrical bracket; 7.1—threaded connection; 7.2—threaded connection; 8—connector.

EMBODIMENTS OF THE INVENTION

The laser two-dimensional triangulation sensor is an electronic device in a metal casing (1).

The housing (1) of the laser triangulation sensor is a part made in the form of two aligned cylinders 22.5 mm and 57 mm in length and 60 mm in diameter and 50 mm in diameter respectively, the second cylinder is a truncated cylinder with a length of 44.9 mm.

The feature of the housing (1) is its cylindrical shape with truncation, which allows to rotate the laser two-dimensional triangulation sensor directly in the hole, and also to change the scanning angles in the plane of the laser beam without touching the surface of the scanned part. This saves time on the immersion and removal operations of the laser two-dimensional triangulation sensor from the hole of the scanned part while changing the scanning angles.

An electronic components of a laser two-dimensional triangulation sensor are inside of the larger diameter cylinder (1). There are a laser emitter (2.1) with a diameter of 12 mm and a length of 20 mm, an electronic circuit board with CMOS matrix (2.2) 20 mm wide and a length of 20 mm, with an angle of 60° to the laser emitter (2.2.1) and a focusing lens (2.3) with a diameter of 8 mm with an angle of 55° to the CMOS matrix. These components are the optical scheme of the sensor (2).

The laser emitter (2.1) generates a beam in the visible band with a wavelength of 640 nm, which unfolds in a line using a lens. The laser line is projected on a scan object. A light reflected from the object and focused by a lens (2.3) is projected onto the electronic circuit board (2.2) with the CMOS matrix (2.2.1).

All parts of optical setup are correspond to Scheimpflug principle (see table 1).

A hole of 20.2 mm diameter is on the cylinder of a larger diameter (1). Radiation and reception of the optical signal of the sensor is through this circular hole. The optical setup of the sensor (2) is protected from external action by a protective glass (5) 20.2 mm diameter, mounted in the hole.

The optical setup of the sensor (2) is protected from external interference by a cover (4) 57.8 MM diameter.

Radiation and reception of the signal by the optical setup of the sensor takes place through a round hole made in a housing with a diameter of 20.2 mm. A protective glass (5) is inserted into the frame of the hole. The place of installation of the optical setup is closed with a round protective cover (4), which is fixed to the housing with screws.

A laser beam emitted by the laser emitter passes through a protective glass and illuminates objects in the measuring range.

The measuring range is an isosceles trapezoid, the small base of which is 3 mm apart from the housing, the larger is 8 mm apart from the housing.

The plane of the beam is perpendicular to the plane of the protective cover (4) of the optical setup. Reflected beam light from the objects falls on the PCB with the CMOS matrix and forms an image, which is then converted into coordinates by range and width.

The originality of the design is that the radiation and reception channels are very close to each other, so the protective glass (5) of the sensor optical circuit is divided into two parts by a thin partition to avoid interference and the parasitic feedback.

The power supply and computation unit (3) (PSCU) is located inside the smaller diameter cylinder of the housing. PSCU (3) is located in the housing part, which is coaxial with the larger cylinder described above. Smaller cylinder of the housing is 50 mm diameter and an arc size of 240°.

From the external impact, PSCU (3) is protected by a cover (6) 54 mm width and 43 mm length.

PSCU (3) is an electronic circuit board 40 mm width, 35 mm length and 10 mm height with the elements installed on it. There are connector (5.1) for connecting to the CPU (5.2) for processing data from the CMOS matrix, CMOS matrix, a power management chip (5.3), power connector (5.4), the data transmission connector (5.5).

The main feature of PSCU (3) is its weight and dimensions. PSCU can be mounted directly into the laser two-dimensional triangulation sensor, not separately from it. Weight of the sensor is 350 g.

Cylindrical bracket (7) 22 mm diameter and 126 mm length. The bracket has a threaded connection (7.1) on the one side for mounting to the housing. The bracket has a threaded connection (7.2) on the another side for mounting on an motorized head, for example on a Tesa Star rotary head.

Cylindrical bracket (7) is mounted with the housing using a hole (1.1) and a threaded connection (7.1).

The assembly of the bracket with the housing makes possible to immerse the laser triangulation sensor in holes up to 200 mm deep.

The bracket (7) has the threaded connection (7.2) for attachment to a motorized head of the type Tesastar-m, Renishaw PH10 and their analogs.

Wires of PSCU communication with PC and power supply are inside the bracket (7). Wires are connected to a connector (8).

The connector (8) provides an eight-pin connection. The advantage of using the bracket that is screwed to the housing of the laser scanner is the ability to vary its length, without changing the dimensions of the housing. This allows to specialize a laser two-dimensional triangulation sensor for specific tasks and hole depths.

The laser two-dimensional triangulation sensor is designed for mounting on Tesastar, Renishaw and Zeiss motorized rotary heads connected with coordinate measuring machines. It can also be used in specialized solutions equipped with mounting elements corresponding to the mounting hole. An example of such a solution can be the installation of the claimed sensor on the thread cutting machine. In this case sensor should be mounted on a special high-precision movement mechanism.

The weight and dimensions of the laser two-dimensional triangulation sensor enable it to be rotated by means of the above-described motorized rotary heads in the entire range of variation of their angles.

The most important difference between the laser two-dimensional triangulation sensor from analogs is the combination of overall dimensions and weight, which is achieved due to ergonomic arrangement of electronic components, specially selected housing geometry, use of aluminum as a casing material and choice of scanning range. This makes it possible to measure holes 65 mm diameter at a depth of up to 200 mm. with an error no more then 5 μm at a speed of 409600 points per second. Also sensor could be mount on Tesastar motorized rotary heads and similar heads (with playload up to 350 grams).

EXAMPLE

The housing (1) is made of aluminum by milling. A cavity for optical setup with a radius of 28 mm is made in the cylindrical part of the housing (1). Radiation and reception of the optical sensor signal is via a round hole in a 20.2 mm diameter. The protective glass (5) is inserted into the hole frame and glued. Cavity is closed with a round protective cover (4), which is fixed to the housing with screws.

The cavity in the truncated cylinder is for installing PSCU. PSCU (3) is fixed in this cavity with screws. The hole is made between the cavity for installing PSCU (3) and the cavity for installing the optical setup (2) by milling. This hole is to connect the optical setup (2) with PSCU (3). A dimensions of the hole is 27 mm length and 25 mm height. The power wires, control wires for laser and matrix interaction, as well as data transmission wires from the matrix to the computer (1.2) are going through this hole.

Figure 3:
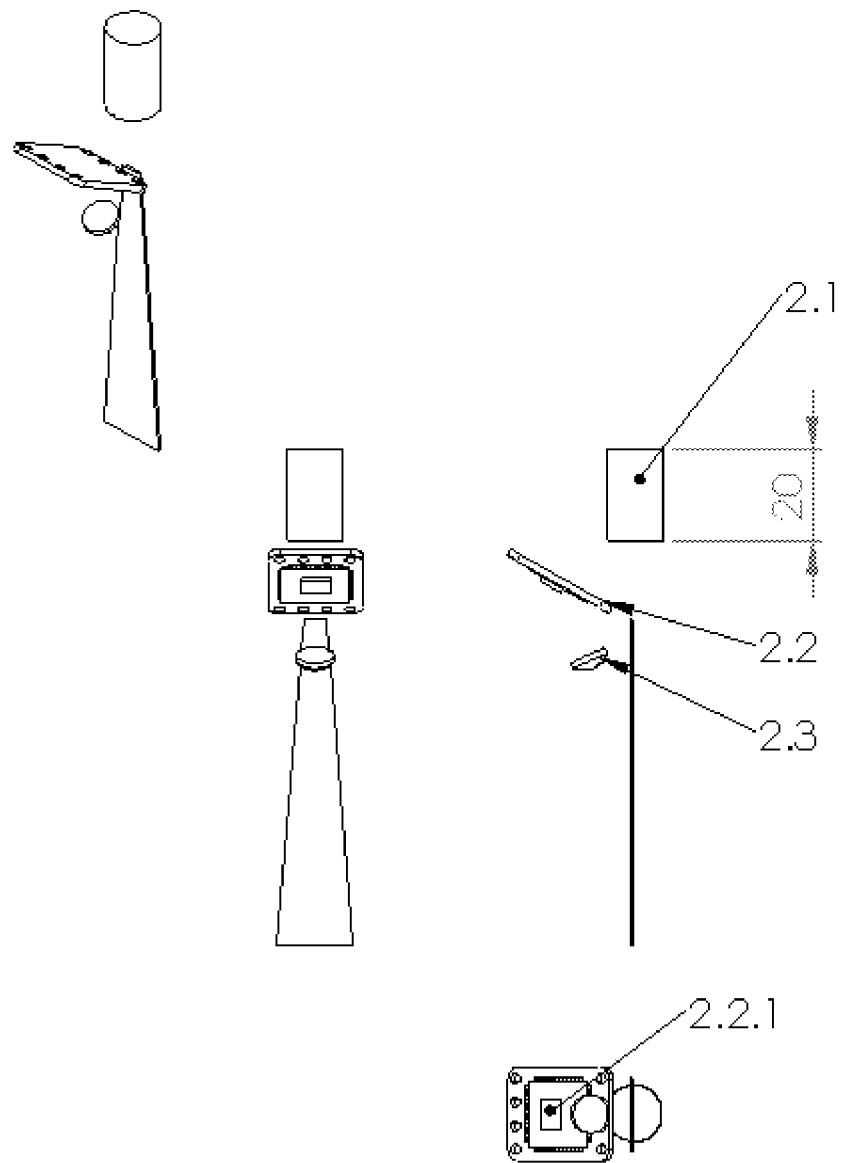
FIG. 3 is the optical schematic of the laser two-dimensional triangulation sensor.

The spatial shape of the housing is shown in an isometric view in FIG. 2. Optical setup is presented in FIG. 3. It consists of a laser emitter (2.1) and an electronic circuit board with a CMOS matrix (2.2, 2.2.1). Laser emits a line that is projected on a scanning object. Reflected light is projected on the lens (2.3).

All elements are located at predetermined angles to each other. Optical setup corresponds to the Scheimpflug principle (see Table 1).

The overall dimensions of the entire optical setup are 42.24*32.93*20 mm. (L, W, H) FIG. 3. Also emission of a laser in the plane of the beam and an isometric view of the optical setup show the relative position of the parts and the laser line.

Figure 4:
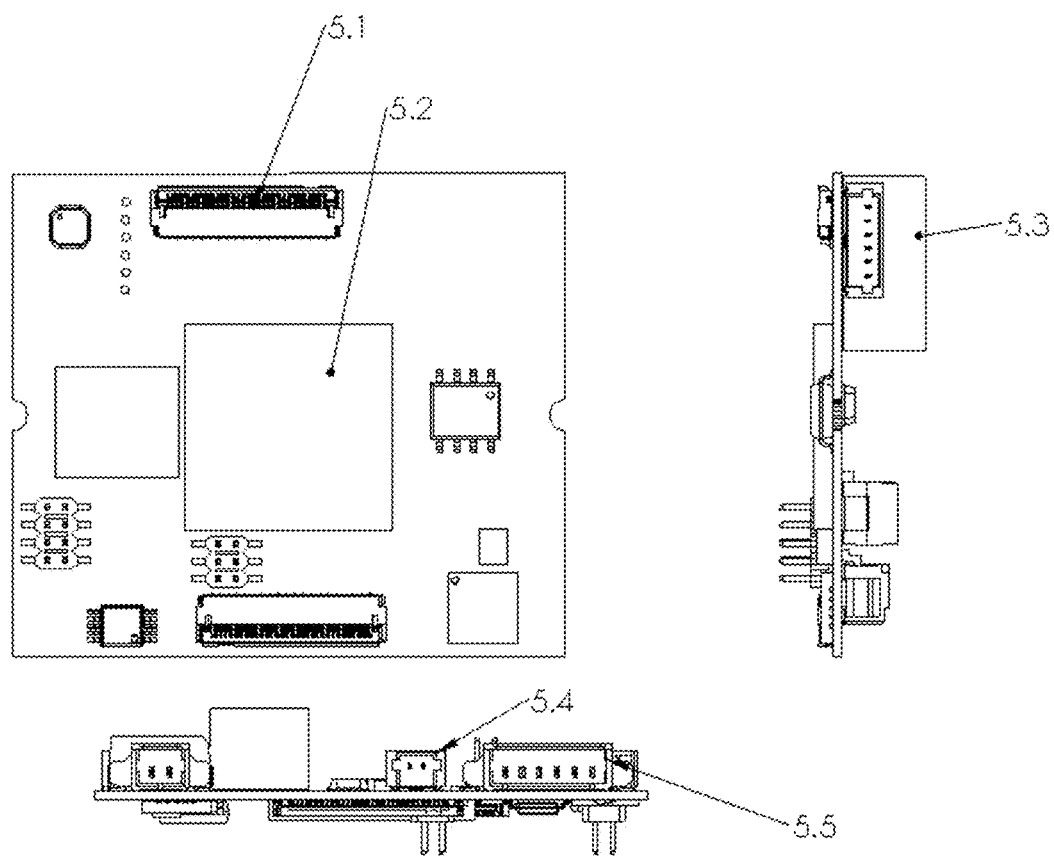
FIG. 4 shows power supply and calculation of a laser two-dimensional triangulation sensor
Figure 5:
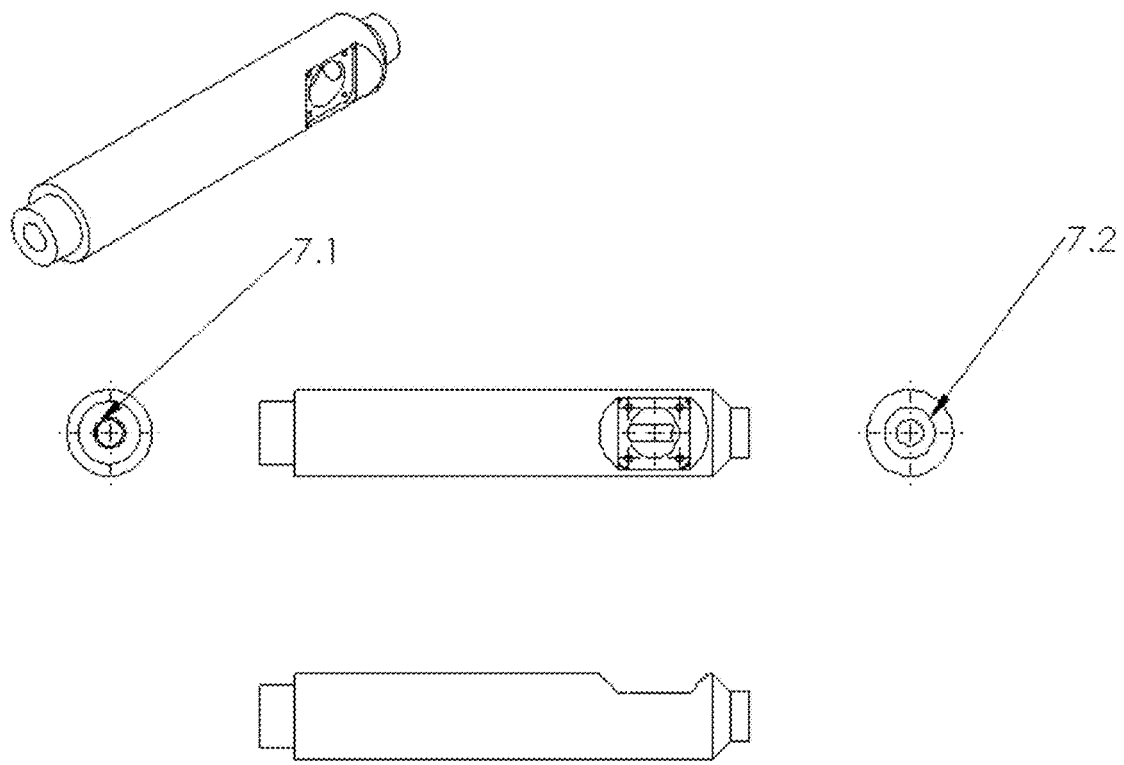
FIG. 5—bracket
Figure 6:
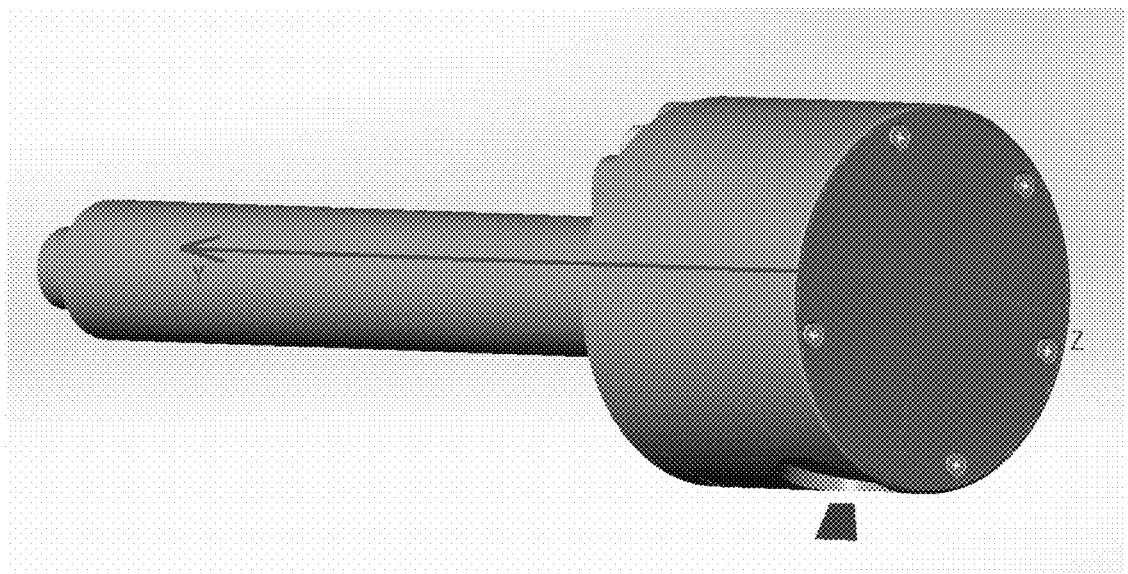
FIG. 6—coordinate system of the laser two-dimensional triangulation sensor

PSCU is presented in FIG. 4. It is a circuit board with CMOS connector (5.1). The CMOS board is connected to this connector using LVDS 40 pin line. The CPU is type of FGPA for processing data from CMOS (5.2). Power management chip (5.3). The power connector (5.4) is connected to the 9-36V power supply, the cable to the connector passes inside the bracket (3). The data transfer connector (5.5) that connects to the PC using a twisted-pair cable over Ethernet, the cable to the connector passes inside the bracket (3). The overall dimensions of the PSCU are 40*35*10.3 mm. (L*W*H). The bracket is shown in FIG. 6. It is a tube, one part of which is attached to the sensor housing, and the other to the motorized rotary head of the coordinate measuring machine. The power cable and communication cable between the PSCU and the PC is inside the bracket. The connector (8) is to connect the device to the PC and power supply. Place for fixing the connector is made on the bracket by milling. The material of the bracket is steel.

Device Operation

The scanner is based on the principle of optical triangulation. The radiation of a semiconductor laser is formed in into the line and projected onto the object. A two-dimensional CMOS matrix with lens collects light scattered at the object.

The resulting image of the object contour is analyzed by a signal processor that calculates the distance to the object (coordinate Z) for each of the set of points along the laser line at the object (coordinate X).

The Configuration Parameters of a Laser Two-Dimensional Triangulation Sensor

1) Exposure: the possibility of changing the exposure of the sensor by commands from a personal computer (delay no more than 10 msec) is realized. It is also possible to turn on the Auto Exposure function (automatic exposure adjustment), which is processed on the sensor processor. The possibility of reprogramming the Auto Exposure function is realized.

2) Laser output power level: the possibility of changing the laser output of the sensor by commands from a personal computer (delay no more than 10 msec) is realized. It is also possible to turn on the function of Autopower (automatic power adjustment), which is processed on the sensor processor. The possibility of reprogramming the Autopower is realized.

3) Operating span: It is possible to change the operating span of the CMOS matrix using the PC to increase the frame frequency (delay not more than 100 msec).

4) Synchronization: it is possible to change the synchronization parameters (by increasing, decreasing pulse front).

5) Operating mode—the possibility of changing the operating mode of the sensor is realized. The transfer of an image or the transfer of a profile could be chosen or both.

Program and Test Procedure for the Laser Two-Dimensional Triangulation Sensor

The tests are carried out using the following technical means:

Plate for verification. The absolute error of the laser two-dimensional triangulation sensor is determined using a calibration plate.

The device for positioning the sensor. The sensor is fixed to the portal coordinate measuring machine (CMM) Hexagon Dea Global Performance with a motorized rotary head Tesastar-m or similar CMM with a similar rotating head. The laser two-dimensional triangulation sensor is attached by means of a stud M8 to the measuring head Tesastar-m, which also has a fixing hole M8. The stud is screwed into the threaded hole of the sensor. The control measuring machine ensures the positioning of the laser two-dimensional triangulation sensor with an error of 1.5+L/333 μm. and a smooth movement of the sensor relative to the measurement object.

Figure 7:
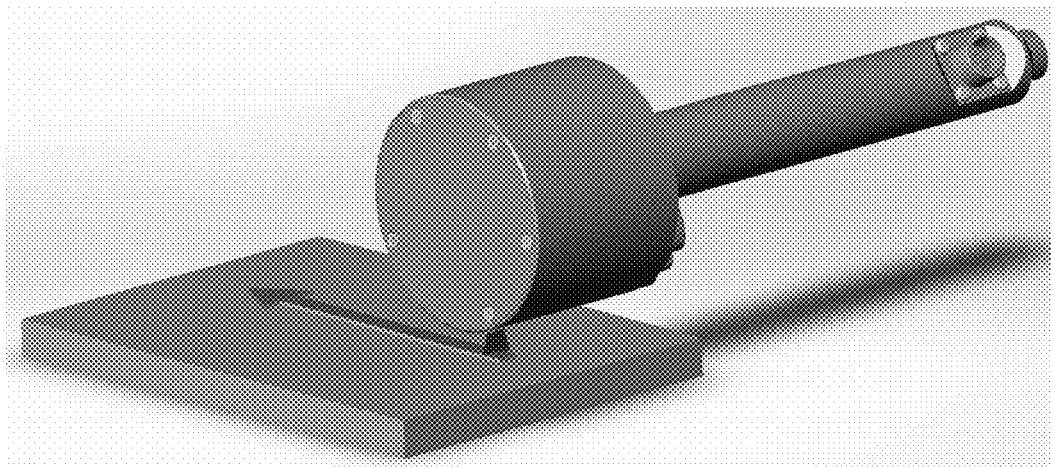
FIG. 7 shows the positions of the laser two-dimensional triangulation sensor:
  a) the Y axis of the scanner is parallel to the plate;
  b) the scanner is rotated by 60° around the Z axis;
  c) the scanner is rotated 60° around the Z axis in the opposite direction;
  d) the scanner is rotated 60° to the left around the Y axis;
  e) the scanner is rotated 60° to the right around the Y axis.
Figure 7:
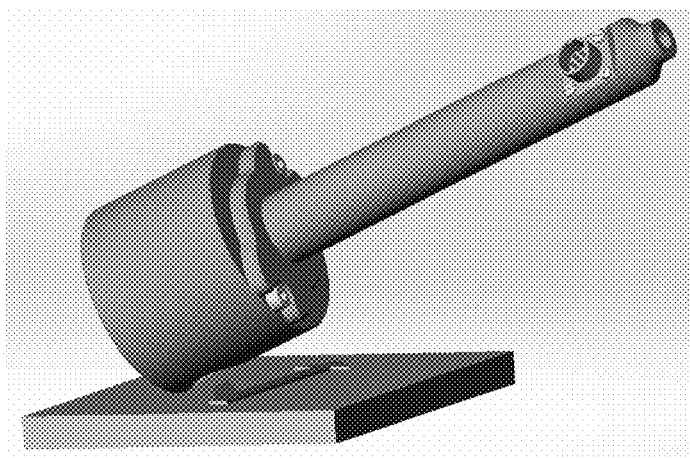
Figure 7:
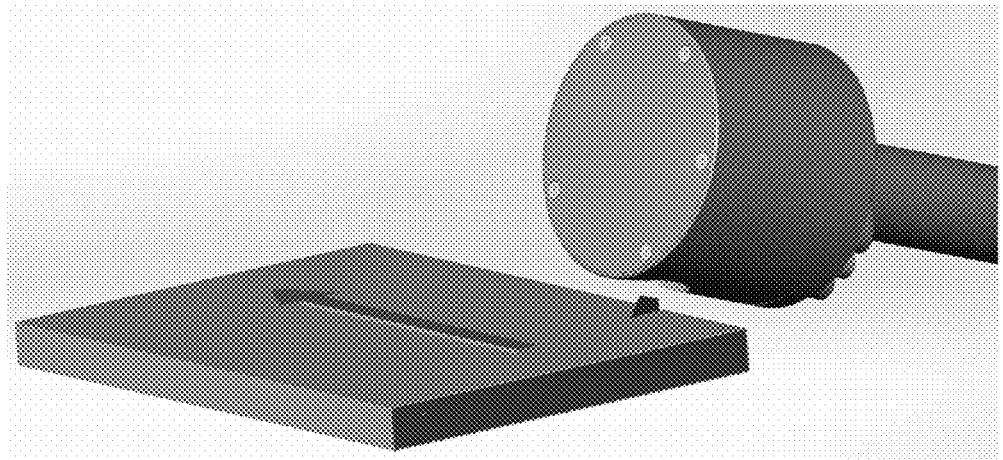
Figure 7:
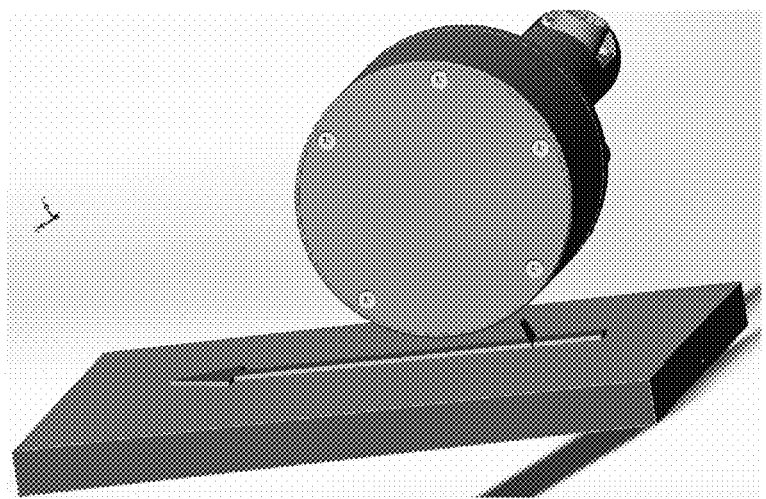
Figure 7:
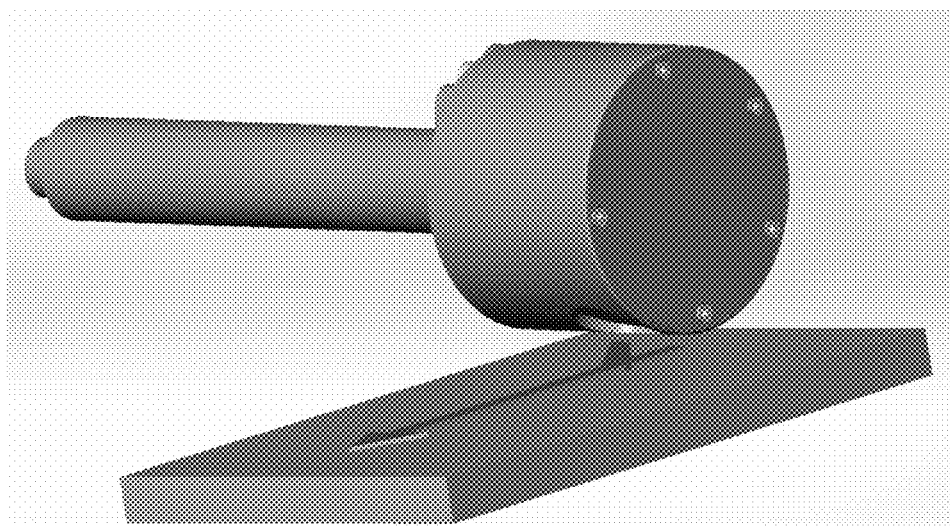

Determination of the Absolute Error of a Laser Two-Dimensional Triangulation Sensor The working surface of the plate is scanned at least 5 times in different positions of the sensor relative to the plate, as shown in FIGS. 7 (a-e). The coordinate system of the sensor is shown in FIG. 6.

FIG. 7. a) The Y axis of the sensor is parallel to the plate; b) the sensor is rotated by 60° around the Z axis; c) the sensor is rotated 60° around the Z axis in the opposite direction; d) the sensor is rotated 60° to the left around the Y axis; e) the sensor is rotated 60° to the right about the Y axis.

The working surface of the plate is scanned for each position of the sensor. The result is 5 point clouds, which are combined into a single point cloud by the software.

The plane is constructed using the method of least squares from the point cloud. The distance between the constructed plane and each point is calculated using the special software (similar to Geomagic Qualify 12). For these distances the absolute error of the laser scan is determined as the mean square deviation of the points in space from the constructed plane. If the hypothesis of the normal distribution of the measured values is not contradicts the results of the Neumann-Pearson test, then mean square method is suitable for erroro determine.

A laser two-dimensional triangulation sensor is considered to have passed the test if the absolute error of the laser scan does not exceed the value indicated in Table 1.

TABLE 1

The main characteristics of the laser two-dimensional triangulation sensor.

| Parameter | Meaning |
| --- | --- |
| Laser class | 2M |
| Range, Z coordinate, mm | 5 |
| Start of operating range (SMR), mm (y) | 3 |
| End of working range (EMR), mm | 8 |
| Linearity, Z-axis (z) | 0.1% of the Z range |

TABLE 1-continued

The main characteristics of the laser two-dimensional triangulation sensor.

| Parameter | | Meaning |
| --- | --- | --- |
| Range, X-axis, mm | SMR (x1) | 5 |
| | EMR (x2) | 7 |
| Linearity, X axis | | 0.2% of the X range |
| Number of points in the Z coordinate | | 640 |
| The number of points along the X coordinate | | 1024 |
| Data refresh rate, not less than | | 400 Hz (for the full operating range) |
| Maximum angle of incidence of the laser beam | | 600 |
| Laser type | | 15 mW, wavelength of 660 nm |
| Output Interface | Digital | Ethernet |
| Synchronization input (synchronization of measurement and of result) | | TTL |
| Supply voltage, V | | 9 . . . 36 |
| Power consumption, W | | 2 |
| Protection class | | IP67 |
| Operating temperature, ° C. | | −20 . . . +60 |
| Weight (without cable), g | | Not more than 350 |
| Length of the power cable, m. | | 5 |
| Length of interface cable, m. | | 5 |
| Time to enter operating mode, min. | | 5 |
| Synchronization input | | logical level 2-5 V |
| Digital interface | | Ethernet 10/100 Mbps, two discrete programmable outputs with open collector |

The invention claimed is:

1. A laser two-dimensional triangulation sensor for measuring small diameter holes, comprising:
    a housing;
    an optical setup,
    a power supply and computation unit;
    a cylindrical bracket;
    wherein the housing consists of two coaxial cylinders interconnected by an inside hole, the first cylinder has a larger diameter and has a hole on the lateral surface covered with a protective glass, and the second cylinder has a smaller diameter and an outside hole at the end surface that is distant from the larger diameter cylinder;
    wherein the optical setup is inside the larger diameter cylinder and consists of a laser emitter, a focusing lens, an electronic printed circuit board with an embedded CMOS matrix mounted at an angle to the focusing lens;
    wherein the power supply and computation unit is inside the smaller diameter cylinder and consists of a CPU mounted on an electronic circuit board, a CMOS connector for data transmission and CMOS control, a power management circuit, a power connector and a computer data connector;
    wherein the power supply and computation unit is connected to the optical setup by power wires, laser and matrix control wires, as well as data transmission wires from the CMOS matrix to the CPU, and said wires are passed via the inside hole between the cylinders;
    wherein the smaller diameter cylinder is connected to the cylindrical bracket by the outside hole of the smaller diameter cylinder, and power wires and data transmission wires are passed via the outside hole into the cylindrical bracket and, optionally, further to a personal computer and a power supply block.

2. The sensor according to claim 1, characterized in that the larger diameter cylinder is 22.5 mm in length and 60 mm in diameter, and the smaller diameter cylinder is 57 mm in length, 50 mm in diameter and is truncated along a chord with a length of 44.9 mm.

3. The sensor according to claim 1, characterized in that the laser emitter is made with a diameter of 12 mm and a length of 20 mm, the electronic printed circuit board of the optical setup is made with a width of 20 mm and a length of 20 mm, and is located at an angle of 60° to the laser emitter, and the focusing lens is made 8 mm in diameter and installed at the angle of 55° to the board with the CMOS matrix.

4. The sensor according to claim 1, characterized in that the electronic circuit board of the power supply and computation unit is made with a width of 40 mm, a length of 35 mm and a height of 10 mm; and power management circuit has an input voltage of 9-36 V.

5. The sensor according to claim 1, characterized in that the laser emitter generates a beam in the visible wavelength range of 640 nm.

6. The sensor according to claim 1, characterized in that the optical setup of the sensor is protected from an external interference by a cover of the optical setup with a diameter of 57.8 mm, and by the protective glass with a diameter of 20.2 mm.

7. The sensor according to claim 1, characterized in that a measuring range of the sensor is an isosceles trapezoid, wherein a small base of the trapezoid is 3 mm apart from the housing, and the other base is 8 mm apart from the housing.

8. The sensor according to claim 1, characterized in that the cylindrical bracket is made with a diameter of 22 mm and a length of 126 mm.

9. The sensor according to claim 1, characterized in that the cylindrical bracket is adapted to be attached to a motorized rotary head.

10. The sensor according to claim 1, characterized in that the sensor housing and the cylindrical bracket are made of aluminum.

* * * * *